United States Patent [19]

Frantom

[11] 4,315,637
[45] Feb. 16, 1982

[54] SEAT BELT WEB GUIDE

[75] Inventor: Richard L. Frantom, Richmond, Mich.

[73] Assignee: Allied Corporation, Morris Township, Morris County, N.J.

[21] Appl. No.: 133,231

[22] Filed: Mar. 24, 1980

[51] Int. Cl.³ .............................................. B60R 21/10
[52] U.S. Cl. .................................... 280/801; 280/802; 280/808
[58] Field of Search ............... 280/801, 802, 807, 808; 24/115 H, 115 K, 136 K, 136 L, 200

[56] References Cited

U.S. PATENT DOCUMENTS 2,784,519  3/1957  Ralston ............................ 24/115 H
4,103,933  8/1978  Fisher ................................. 280/801
4,241,941  12/1980  Ymamoto ........................... 280/808

FOREIGN PATENT DOCUMENTS 2244419  3/1974  Fed. Rep. of Germany.

Primary Examiner—Robert R. Song
Attorney, Agent, or Firm—Roger H. Criss

[57] ABSTRACT

A seat belt web guide in the form of a loop of seat belt webbing formed by folding over an end of the webbing. A housing is preferably provided to retain the loop of webbing in an open position so as to permit a seat belt harness to extend through the loop. The housing may be of a lightweight plastic material since it need not be load bearing.

18 Claims, 4 Drawing Figures

SEAT BELT WEB GUIDE

DESCRIPTION

BACKGROUND OF THE INVENTION

1. Field of the Invention

This invention relates to a load-bearing seat belt webbing guide.

2. Description of the Prior Art

In both active and passive seat belt systems load-bearing webbing guides are commonly used. Because these devices are subject to occupant-induced loads resulting from crashes, their strength must be high. Failure of such a device would allow the occupant to become unrestrained. Accordingly, these devices are usually fabricated of metal to provide the desired structural strength. Such devices are usually provided with a plastic surface for reducing friction on the webbing.

Consistent with vehicle weight reduction objectives to meet fuel economy standards, it would be desirable if such load bearing webbing guides could be fabricated of lightweight materials without sacrificing their ability to withstand the high loads to which they would be subjected under crash conditions.

SUMMARY OF THE INVENTION

In accordance with this invention, there is provided a web guide for permitting seat belt webbing to pass therethrough, comprising:

a length of fiber containing material, the material being shaped so as to define a loop having an opening sufficiently large as to permit seat belt webbing to pass through the loop, and means in the web guide to retain the loop in an open position for receiving the seat belt webbing therethrough.

Preferably the fiber containing material is seat belt webbing and the loop is formed by sewing the free end of the webbing to itself at an appropriate distance spaced from the free end. The retaining means is preferably a housing surrounding the loop and formed from a lightweight material. That portion of the loop to be contained within the housing is preferably folded longitudinally to minimize the required thickness of the housing.

The housing has an opening preferably in the form of an elongated slot adapted to receive seat belt webbing which is free to slide therethrough, and is preferably fabricated of a plastic material. The structural strength of the housing beyond that required for ordinary usage is not critical, for should the web guide housing collapse under the load experienced in a vehicle crash, separation between the pass-through webbing and the webbing loop does not occur, as the inherent strength of the seat belt webbing in the loop exceeds these load values.

Also in accordance with this invention, there is provided in a vehicle seat belt system including a connecting member having one end adapted for communication with a structural member of the vehicle and a web guide at the opposite end for receiving seat belt webbing to pass therethrough and engage about an occupant of the vehicle, the improvement comprising the connecting member at least partially being formed of fiber containing material, the web guide comprising a loop of the fiber containing material having an opening sufficiently large so as to permit the seat belt webbing which engages about the occupant to pass therethrough, and retaining means in the web guide to retain the loop in an open position. The vehicle seat belt system may be an active or passive system and preferably the fiber containing material is seat belt webbing.

The present invention thus provides a web guide which is lightweight and yet load-bearing and utilizes the strength characteristics of the fiber containing material (seat belt webbing) itself.

DESCRIPTION OF THE PREFERRED EMBODIMENTS

Figure 1:
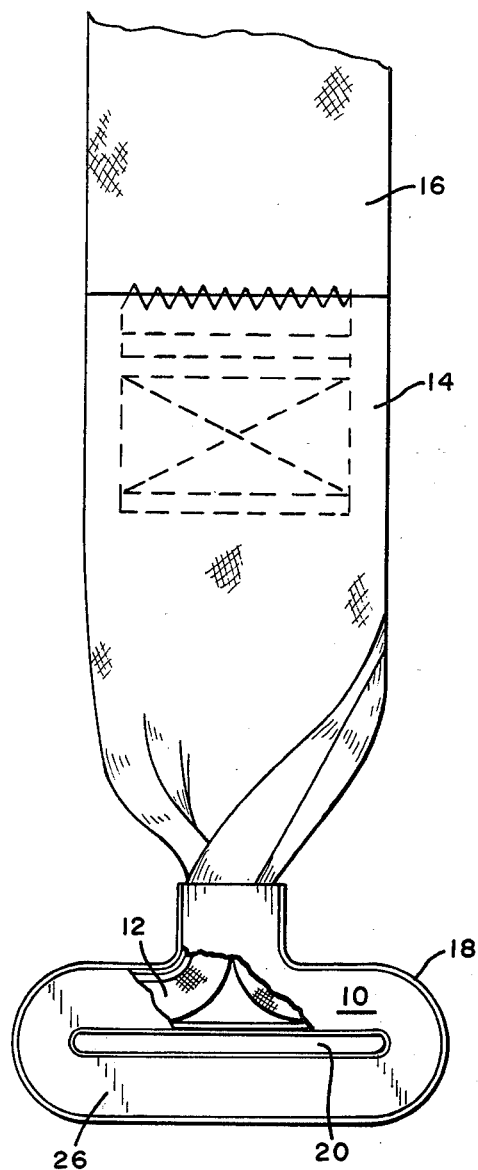
FIG. 1 is a break-away plan view of one embodiment of the web guide of this invention.
Figure 2:
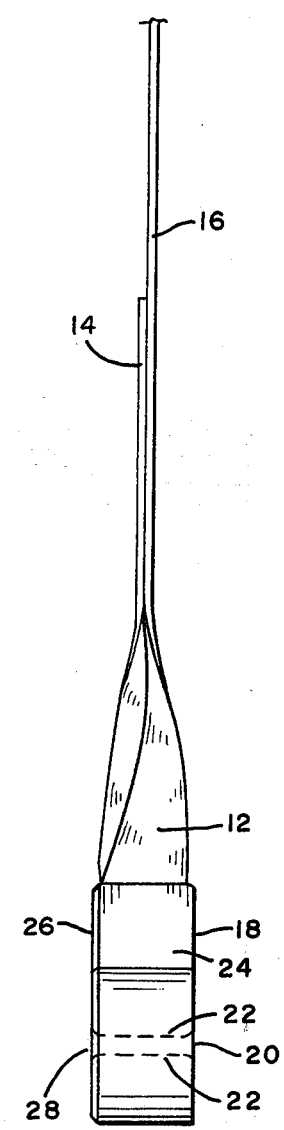
FIG. 2 is a side view of the web guide of FIG. 1.

With reference to FIGS. 1 and 2, a web guide 10 is shown. Web guide 10 is preferably fabricated of a plastic or other suitable lightweight material and is shaped to accommodate a loop 12 of seat belt webbing 16. This loop can be produced as shown by doubling back end 14 of belt 16 for a distance somewhat greater than that required by its route within web guide 10, and completing the loop by any suitable means such as by sewing with a suitable strong box stitch. In order to limit the thickness of web guide 10 for compactness, that portion of the webbing loop to be contained in a housing 18 is folded longitudinally and extended around a slotted opening 20 in housing 18 through which the webbing is to slidably pass. Preferably the walls 22 surrounding slot 20 are constructed by shaping, surface treatment or composition to minimize friction and enhance the slidability of the webbing to pass therethrough.

Much latitude is possible in the outward shape of web guide 10. Preferably loop 12 is encapsulated as shown. Housing 18 includes a lower portion 24 closed on one side except for slot 20 which is substantially in the form of a flattened tube extending completely through the guide 10 for the passage of webbing. The end of loop 12, folded longitudinally, is positioned in the housing, encircling slotted opening 20, and a cover plate 26 is affixed by snap fit, an adhesive, ultrasonic welding or the like, to thus encapsulate the enclosed loop. Cover plate 22 is also slotted at 28 to align with the slotted opening 20 through the web guide and is also preferably formed of a lightweight plastic material.

It is to be understood that web guide 10 may be formed in one piece and need not be enclosed. The primary purpose of web guide 10 is to retain the loop of webbing in its open position and hence many forms of the web guide are possible.

Figure 3:
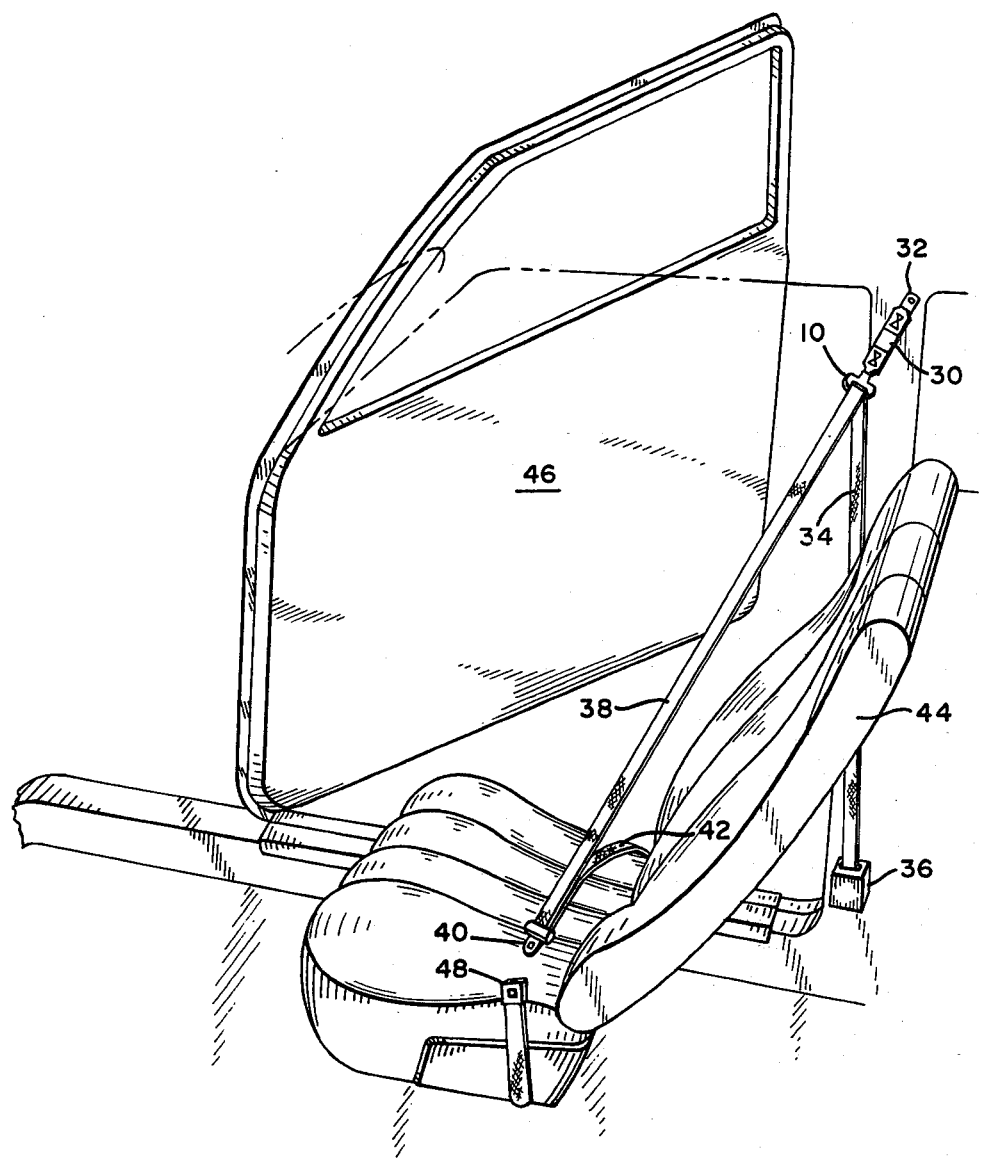
FIG. 3 is a view of the web guide of this invention used in conjunction with an active seat belt system.

FIG. 3 depicts one type of an active seat belt system in which the web guide of this invention may be employed. As shown, web guide 10 is part of a connecting strap 30 which is affixed at 32 to a structural part of the vehicle, such as the B-pillar. Web guide 10 acts as a direction-changing device for seat belt webbing 34 which is in the form of a continuous loop extending from retractor 36 suitably mounted on the B-pillar, through web guide 10 to form a shoulder belt portion 38, through a conventional adjust tongue 40 to form a lap belt portion 42 and thence mounted to the vehicle floor (at a position not shown) on the outboard side of seat 44 adjacent to door 46. Tongue 40 is engaged with buckle 48 by an occupant in a conventional manner.

Retractor 36 may be of any of the conventional emergency locking types, for example.

As indicated above, web guide 10 is fabricated of a lightweight non-load bearing material such as plastic. However, separation of the strap 30 and seat belt webbing 34 will not occur under the stress and load experienced in a crash. Such separation is prevented in consequence of the novel construction of the web guide 10 of this invention, wherein the length of webbing 16 constituting strap 30 ends in loop 12 which encircles the opening through which webbing 34 passes. Should the load be sufficiently great as to cause non-load bearing housing 18 of web guide 10 to collapse, webbing 16 and webbing 34 would not separate, as the loop of webbing 12 at the free end of the length of webbing 16 would continue to encircle webbing 34. Such webbing has the inherent strength to withstand loads such as result from the lurch of a passenger against the restraining seat belt and shoulder harness in the event of a crash of the vehicle.

Figure 4:
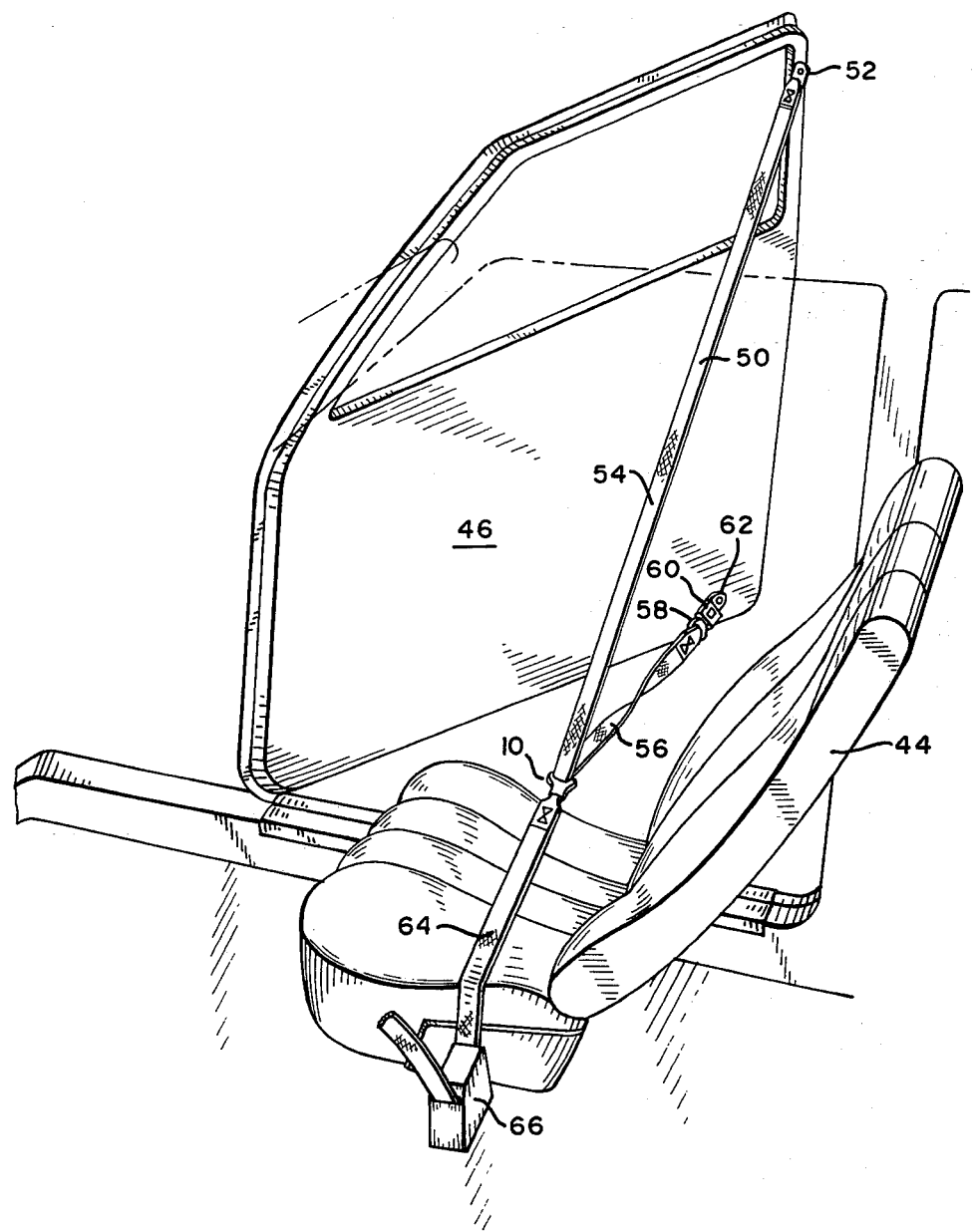
FIG. 4 is a view of the web guide of this invention used in conjunction with a passive seat belt system.

FIG. 4 illustrates one type of a passive seat belt system in which web guide 10 may be employed. In the system shown, a loop of webbing 50 is provided on door 46. Webbing 50 extends from an upper frame bracket 52 to web guide 10, thereby forming a shoulder belt portion 54, and through the slot in web guide 10 back towards door 46, thereby forming a lap belt portion 56. As shown, lap belt portion 56 terminates in a tongue 58 releasably received in buckle 60 mounted to door 46 by bracket 62. Tongue 58 and buckle 60 provide one form of an emergency release for the system, if desired. However, a release in the seat belt retractor may alternatively be provided.

Web guide 10 is connected via connecting seat belt webbing 64 to a conventional seat belt retractor 66. When door 46 is closed, webbing 50 is automatically placed about an occupant in seat 44 as excess amounts of connecting webbing 64 are taken up by retractor 66. As explained above, the loop of webbing 12 through which webbing 50 extends provides the load-bearing portion of the web guide (junction ring) 10 and retains the integrity of the seat belt system even though the non-load bearing portion of web guide 10 may collapse as a result of crash forces.

Although in the foregoing description it has been indicated that the web guide is associated with both shoulder and lap belts, it is also possible to use this guide on either belt with the exclusion of the other, if desired.

In addition, although in the foregoing the fiber containing material has been particularly described as seat belt webbing, it is to be understood that other forms of fiber cpontaining materials may be employed such as rope, narrow strapping, nonwoven fabrics and the like. Preferably, the fiber containing material is a lightweight strong material formed from textile filaments, for example such synthetic materials as nylon or polyester.

Furthermore, the web guide of this invention may include a locking means to lock against the seat belt webbing which passes therethrough, as is described for example in U.S. patent application Ser. No. 57,605, filed July 16, 1979.

It is to be understood that variations and modifications of the present invention may be made without departing from the scope thereof. It is also to be understood that the invention is not to be limited by the specific embodiments disclosed herein but only in accordance with the appended claims when read in the light of the foregoing specification.

I claim:
1. A web guide for permitting seat belt webbing to pass therethrough, comprising:
   (a) a length of fiber containing material, said material being shaped so as to define a loop having an opening sufficiently large as to permit seat belt webbing to pass through said loop; and
   (b) means in said web guide to retain said loop in an open position in the form of a substantially elongated slot for receiving said seat belt webbing therethrough.
2. The web guide of claim 1 wherein said fiber containing material comprises seat belt webbing.
3. The web guide of claim 2 wherein said means to retain said loop comprises housing means surrounding said loop, said housing means including an opening at least partially overlapping said loop of webbing, said opening in said housing being of a sufficient size to receive said seat belt webbing, whereby said seat belt webbing may pass through said housing and said loop.
4. The web guide of claim 3 wherein said housing means is formed of a non-load bearing material.
5. The web guide of claim 4 wherein said housing means is formed of plastic material.
6. The web guide of claim 5 wherein said housing means comprises two sections secured together.
7. The web guide of claim 6 wherein one of said sections includes an upstanding portion defining a first slotted opening and said other section comprises a cover plate including a second slotted opening coextensive with said first slotted opening.
8. The web guide of claim 2 wherein said seat belt webbing defining said loop includes a longitudinally folded section of webbing and wherein said means to retain said loop in an open position also retains said loop in its folded position.
9. The web guide of claim 2 wherein said loop is formed by folding an end of said seat belt webbing and securing said end to said webbing.
10. The web guide of claim 2 wherein said guide is in the form of a D-ring, and including fastening means on said length of webbing located at a position spaced from said loop, said fastening means being adapted for mounting on a structural member of a vehicle.
11. The web guide of claim 2 wherein said webbing includes means on its end opposite to said loop adapted for securing to a seat belt retractor.
12. The web guide of claim 1 wherein said fiber containing material is formed into said loop by attachment of a free end thereof to the remaining portion of the material and physical securement of said free end to said material.
13. The web guide of claim 12 wherein said free end of said material is attached to said material by means of stitching.
14. In a vehicle seat belt system including a connecting member having one end adapted for communication with a structural member of said vehicle and a web guide at the opposite end for receiving seat belt webbing to pass therethrough and engage about an occupant of said vehicle, the improvement comprising:
   said connecting member at least partially being formed of fiber containing material, said web guide comprising a loop of said fiber containing material having an opening sufficiently large so as to permit said seat belt webbing which engages about said occupant to pass therethrough, and retaining means in said web guide to retain said loop in an open position in the form of a substantially elongated slot.

15. The seat belt system of claim 14 wherein said fiber containing material comprises seat belt webbing.

16. The seat belt system of claim 14 wherein said one end of said connecting member is adapted for rigid attachment with said structural member.

17. The seat belt system of claim 14 including a seat belt retractor attached to said one end of said connecting member.

18. The seat belt system of claim 15 wherein said seat belt webbing is formed into said loop by attachment of a free end thereof to the remaining portion of said webbing, said free end being secured by stitching.

* * * * *